Figure 1:
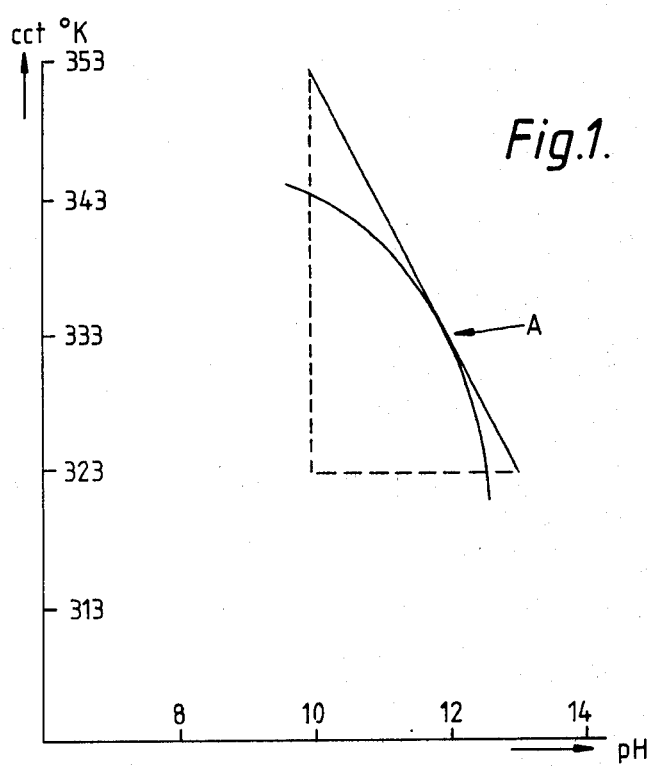

United States Patent [19]

Barlow et al.

[11] Patent Number: 4,460,439
[45] Date of Patent: Jul. 17, 1984

[54] COATING PROCESS

[75] Inventors: Alan R. Barlow, Berkshire; Andrew Doroszkowski, Buckinghamshire, both of England

[73] Assignee: Imperial Chemical Industries PLC, London, England

[21] Appl. No.: 547,352

[22] Filed: Oct. 31, 1983

[30] Foreign Application Priority Data

Nov. 18, 1982 [GB] United Kingdom ............... 8232873

[51] Int. Cl.$^3$ ..................... C25D 9/02; C25D 13/06
[52] U.S. Cl. .............................. 204/56 R; 204/181 C
[58] Field of Search .................. 204/56 R, 56 M, 58, 204/181 C

[56] References Cited

U.S. PATENT DOCUMENTS 3,702,288 11/1972 Erinjeri ........................ 204/181 R
3,862,894 1/1975 McGuire et al. ............... 204/181 C
4,260,716 4/1981 Christenson et al. ........... 204/181 C

OTHER PUBLICATIONS

Napper, D. H., "Steric Stabilization", *Journal of Colloid and Interface Science*, vol. 58, 1977, pp. 390-407.

Primary Examiner—John F. Niebling
Assistant Examiner—B. J. Boggs, Jr.
Attorney, Agent, or Firm—Cushman, Darby & Cushman

[57] ABSTRACT

A conductive substrate as cathode is coated by electrodeposition using a coating material which comprises a sterically stabilized dispersion of film-forming polymer particles in an aqueous medium, the polymer comprising or being associated with a stabilizing polymeric non-ionic hydrophilic moiety which is solvated by the aqueous medium and being free from stabilizing ionic charges. The dispersion of film-forming polymer particles has a critical coalescence value which is more negative than −0.3 units.

8 Claims, 2 Drawing Figures

COATING PROCESS

This invention relates to a process for coating a conductive substrate by electrodeposition, to a coating composition useful in the process and to a coated substrate obtained by the process.

It is known that when certain organic coating materials are dispersed in an aqueous medium they may be caused to deposit on an electrode when an electric current is passed between that electrode and a counter electrode immersed in the dispersion. Dispersed materials which are stabilised due to the presence of ionised carboxylic groups will deposit at the anode and dispersed materials which are stabilised due to the presence of basic groups, such as various ionised amine or quaternary ammonium salt groups, will deposit at the cathode. These electrodeposition processes have been extensively studied and patented. They have been reviewed by F. Beck in "Fundamental Aspects of Electrodeposition of Paint" ('Progress in Organic coatings', 4 (1976)(pages 1–60) and have been summarised in "Skeist Laboratories Report, Coatings III", Nov. 1980, pages 538–547.

A characteristic feature of all of the dispersions used in the above-mentioned prior processes is that the disperse particles are charge-stabilised and hence exhibit a high electrophoretic mobility when measured as described below. For example, an epoxy resin-based cationically stabilised dispersion, which is commercially available as "ED 3002" from PPG Industries and is maintained in a stable state in a coating bath at a pH of 6 to 6.5, was found to have an electrophoretic mobility of 5.7 microns ($\mu$)/sec./V/cm when measured at high dilution in $10^{-3}$M potassium chloride at a pH 6 (acidified with HCl) using a Rank Brothers Mk 2 instrument fitted with a rotating prism, as described in the chapter "Electrophoresis of Particles in Suspension" by A. M. James in the text book 'Surface and Colloid Science', Volume II (edited by R. J. Good and R. R. Stromberg). Similarly an "Appliance Cationic Acrylic Electrocoat—AC500C1211/AC500Z1210 WCX5072", commercially available from PPG Industries, and normally maintained in a pH range of 5.8 to 6.2, was found to have an electrophoretic mobility of 4.7 $\mu$/s/V/cm at pH 6 in $10^{-3}$ potassium chloride. The electrophoretic mobility of a commercially available epoxy resin-based cationically stabilised dispersion of a type which is broadly described in British Pat. No. 1,461,823 was found to be 6.1 $\mu$/s/V/cm at pH 4 in $10^{-3}$ potassium chloride. A cationically-stabilised model dispersion, stabilised with quaternary ammonium groups, was prepared by copolymerising methyl methacrylate, ethyl methacrylate, and dimethyl ammonium ethyl methacrylate in the weight ratio 50/45/5, then quaternised with benzyl chloride to give a 40% copolymer solution and the copolymer then emulsified in de-ionised water to give a dispersion of polymer particles. The particles were found to have an electrophoretic mobility of 6 $\mu$/s/V/cm at pH 7 in $10^{-3}$M potassium chloride.

The dispersions just described are stabilised due to the presence of ionic groups and are known as charge-stabilised dispersions. When the disperse phase constitutes 10% by weight of a total dispersion the presence of the ionic groups causes the electrical conductivity of the aqueous medium to be of the order of 1000 microSiemens/cm (see page 4 of the F. Beck reference mentioned above).

We have now found that certain coating materials which are dispersed in an aqueous medium and are stabilised in the aqueous medium due to the solvation of certain polymeric non-ionic hydrophilic moieties, i.e. they are sterically stabilised, will electrodeposit at a cathode. These materials are substantially free from ionic groups and therefore have a very low electrophoretic mobility.

According to this invention, we provide a process for coating a conductive substrate wherein the substrate is immersed in a coating composition comprising an aqueous medium and a dispersed coating material, the substrate is made a cathode in an electric circuit, and an electric current is passed between the cathode and a counter-electrode until a desired amount of coating material is deposited on the cathode, characterised in that:

(a) the coating material comprises a film-forming polymer which is sterically stabilised as a dispersion of particles in the aqueous medium and is free from stabilising ionic charges.

(b) the film-forming polymer comprises, or is associated with, a polymeric non-ionic hydrophilic moiety which is solvated by the aqueous medium and which contributes to the steric stabilisation of the film-forming polymer particles in the aqueous medium; and (c) the dispersion of film-forming polymer particles in the aqueous medium has a 'critical coalescence value (ccv)' as herein defined which is more negative than $-0.3$ units.

By "steric stabilisation" of a film-forming polymer we mean that disperse particles of the polymer are stabilised by being surrounded by a sheath of solvated polymeric material such that if two such particles come into contact, as for example during particle collision, then a repulsive energy is called into play which emanates from the conformational changes in the solvated layer to maintain the individual independent identity of the particles and does not rely on the presence of charge for dispersion stability. The nature of steric stabilisation is discussed by D. H. Napper in J Colloid and Interface Sci., 58, 390 (1977). In the present case the solvated component is a polymeric non-ionic hydrophilic moiety, for example a moiety of poly(ethylene glycol).

A clear distinction must be drawn between 'steric stabilisation' and 'charge stabilisation'. It is known that flocculation will result when a polyelectrolyte is added to a dispersion of particles which carry a surface charge of sign which is opposite to that of the polyelectrolyte (see Kuzkin & Nebera, "Synthetic Flocculants in De-Watering Processes, Moscow 1963, and P. F. Wilde & R. W. Dexter, Br. Polymer J., 1972, 4, 239). For example, a cationically stabilised dispersion of particles of the type used for conventional cathodic deposition will flocculate when ammonium polyacrylate is added to it. However, flocculation does not result when a polyanionic electrolyte is added to the sterically stabilised dispersions of the present invention. The behaviour of the sterically stabilised and charge-stabilised dispersions towards a polyelectrolyte is illustrated in Example 14 below.

As mentioned above the dispersed coating material of this invention is of low electrophoretic mobility which is in contrast to the ionised coating materials which are employed in the known cathodic deposition processes. The electrophoretic mobility of particles of the material is measured at very high dilution in $10^{-3}$M potassium chloride and at the pH to be employed in a coating process wherein the dispersion is stable. A suitable microelectrophoresis technique for the measurement of electrophoretic mobility is the Rank Brothers instrument described by A. L. Smith at page 135 of "Dispersions of Powders in Liquids" edited by G. D. Parfitt (Applied Science Publishers, 3rd edition). Preferably the electrophoretic mobility is not greater than 2 $\mu$/s/V/cm, more preferably not greater than 1.5 and still more preferably not greater than 1 $\mu$/s/V/cm. All of the dispersions described in the Examples had an electrophoretic mobility of less than 2 $\mu$/s/V/cm; for example the emulsion particles of Example 2 had an electrophoretic mobility of less than 0.7 $\mu$/s/V/cm in $10^{-3}$M potassium chloride at pH 6.9.

A further distinction between the compositions used in the present process and those used in the known cathodic deposition processes is that the conductivity of the aqueous medium in the present compositions is very low. Preferably the conductivity of the aqueous medium is less than 250 microSiemens/cm when the disperse polymer phase constitutes 10% by weight of the total weight of the dispersion, more preferably less than 150 microSiemens/cm. The conductivity of the aqueous medium in the ionically stabilised dispersions used for deposition at a cathode is commonly in the region of 1000 microSiemens/cm.

In stating that the coating composition comprises a dispersion of film-forming polymer which is free from stabilising ionic charges we mean that the film-forming polymer does not contain or is not associated with (for example in an associated surfactant) such an amount of ionic charges as will primarily determine the stability of the dispersion i.e. the disperse film-forming polymer must be stabilised primarily by steric stabilisation. As indicated above a charge-stabilised dispersion is flocculated by a polyelectrolyte which has a charge opposite in sign to that carried by the disperse particles. Preferably the film-forming polymer does not contain or is not associated with any significant ionic charge.

A wide range of coating materials may be employed in the present process. They will comprise at least one film-forming polymer which is sterically stabilised in the aqueous medium and which is free from stabilising ionic charges. Mixtures of polymers, for example mixtures with other types of polymer, may be employed provided that the stability of the dispersion as a whole conforms to the requirements of the present process. Suitable types of film-forming polymer which can be sterically stabilised include the synthetic addition polymers and copolymers and condensation polymers. Specific chemical types of polymer include epoxy resins, alkyd resins, polyurethane resins and polyester resins. Particularly suitable film-forming polymers are the epoxy resins and these may be reacted, for example, through an epoxide group, with other materials in order to modify their deposition and other characteristics. In one instance an epoxy resin may be reacted with a polycaprolactone and in another instance the epoxy resin may be reacted with a polyether. We have also found that the deposition characteristics of the epoxy resin-based polymers may be improved when free epoxide groups are esterified, preferably with benzoic acid or a substituted benzoic acid. In another instance, the epoxy resin may be modified by grafting to it an addition polymer.

The polymeric non-ionic hydrophilic moiety which is solvated by the aqueous medium can be derived from a water-soluble polymer. Preferably the moiety is derived from a water-soluble polymer which comprises repeating oxyethylene units. Examples of polymers from which the moiety may be derived include those available commercially in a range of molecular weights, depending upon the number of oxyethylene units present, and known as polyethylene glycols. The moiety may be derived from these polymers as such or from their monoalkyl ethers in which the alkyl group contains 1–4 carbon atoms. Other suitable polymers include those comprising both oxyethylene units and different oxyalkylene units, for example poly(ethylene oxide)-poly(propylene oxide) copolymers in which there is present at least 40% of ethylene oxide. The moieties may be introduced into film-forming polymers by conventional procedures for example by esterification or by etherification. For example, when the film-forming polymer is based on an epoxy resin, a suitable moiety may be introduced by reaction of an epoxide group with a poly(ethylene glycol). The number of moieties which are to be present in the film-forming polymer in order for deposition to occur will clearly depend upon such variables as the nature of the polymer and the number of oxyethylene units in the moiety. The proportion of repeating oxyethylene units in the total film-forming polymer is determined by the molecular weight of such units in each moiety and by the number of distinct moieties which are present. Preferably, the molecular weight of the repeating oxyethylene units in each moiety is greater than 200 and the total content of repeating oxyethylene units in the film-forming polymer is preferably in the range 1–60% by weight. However, the precise selection of a suitable film-forming polymer must be guided by the result of the test procedure described below for determining the critical coalescence value.

The film-forming polymer may also be sterically stabilised in the aqueous medium due to its association with a distinct surfactant which comprises a polymeric non-ionic hydrophilic moiety of the type described above.

The coating material may also comprise other ingredients commonly used in the formulation of coatings, for example cross-linking and curing agents, pigments and fillers, organic liquids and catalysts. Suitable cross-linking agents include for example blocked isocyanates, urea-, melamine-, or phenol-formaldehyde resins and multifunctional $\beta$-hydroxy esters such as are described in European patent application No. 0040867.

In referring to a dispersion of polymer particles in an aqueous medium we are not limited to any specific type of dispersion, for example as to the size of disperse particle, and the term 'dispersion' can include for example a colloidal dispersion, an emulsion of liquid particles or a dispersion of solid particles. A particularly suitable dispersion is one which is made by emulsifying the film-forming polymer which may be dissolved in solvent, and optionally together with cross-linking agent, pigment, organic liquid or other additives, in an aqueous medium with suitable agitation. For example the film-forming polymer and a crosslinking agent may be mixed in weight ratios in the range 1:4 to 12:1 and stirred and optionally heated to ensure homogeneity. Small quantities of solvent may be added as required and the product emulsified in water. Pigment, filler and other additives may be incorporated together with the film-forming polymer and co-emulsified in water or these materials may be incorporated separately. Preferably the coating compositions used in the present process comprise 5–45%, and more preferably 7–35%, by weight of coating material dispersed in the aqueous medium.

Thus the present invention also provides a coating composition suitable for use in the process herein described which comprises an aqueous medium and a dispersed coating material characterised in that:
(a) the coating material comprises a film-forming polymer which is sterically stabilised as a dispersion of particles in the aqueous medium and is substantially free from stabilising ionic charges;
(b) the film-forming polymer comprises, or is associated with, a polymeric non-ionic hydrophilic moiety which is solvated by the aqueous medium and which contributes to the steric stabilisation of the film-forming polymer particles in the aqueous medium; and
(c) the dispersion of film-forming polymer particles in the aqueous medium has a 'critical coalescence value (ccv)' as herein defined which is more negative than −0.3 units.

The sterically stabilised film-forming polymers which are useful in the present process are selected by a test procedure which will now be described. Without being bound by our present belief, we believe that this test procedure selects those film-forming polymers which are deposited at a cathode due to a decrease in the solubility of the sterically stabilising polymer non-ionic hydrophilic moiety when in the vicinity of the cathode. This is believed to lead to a loss in repulsion energy of the steric barriers around the particles in the conditions of high pH and joule heating which prevail in the vicinity of the cathode when an electric current is passed.

A dispersion of the film-forming polymer (and if necessary any other ingredient of the coating material which in use could significantly affect the coalescing behaviour of the film-forming polymer) which is stable at the temperature and pH conditions of a proposed process according to the invention is prepared in a small beaker at 10% by weight disperse polymer phase based on the total weight of the dispersion and at the optimum pH for stability. A magnetic bead is placed inside the beaker so that gentle stirring may be achieved when using a 'magnetic hot-plate' device. The small beaker is surrounded by a larger beaker containing water which acts as a water-bath to ensure even heating by a magnetic hot-plate device placed beneath it. A thermometer is placed in the dispersion and heat is applied so that the temperature of the dispersion is gradually increased from the ambient temperature by about 1° C. per minute with gentle agitation via the magnetic bead. The temperature at which coalescence of the dispersion is clearly detectable is noted and this temperature is recorded as the critical coalescence temperature (cct) in degrees absolute (°K.). Values of the cct are determined for the dispersion at various pH values in the region 8–13 by suitable adjustment of the pH with alkali (for example sodium hydroxide or ammonia) and a plot of cct versus pH is obtained as shown in FIG. 1. The critical coalescence value (ccv) is calculated from the relationship $$ccv = \frac{20\ d(cct)}{A\ d(pH)}\ \text{(inverse pH) units}$$

where A=cct at pH 12 in °K. and d(cct)/d(pH) is the slope of cct/pH plot at pH 12.

Suitable film-forming polymers in the present process are those which provide a ccv which is more negative than −0.3 units. If coalescence of a film-forming polymer occurs at ambient temperature at a pH of 12 or less then this polymer is deemed to have a ccv more negative than −0.3 units.

Figure 2:
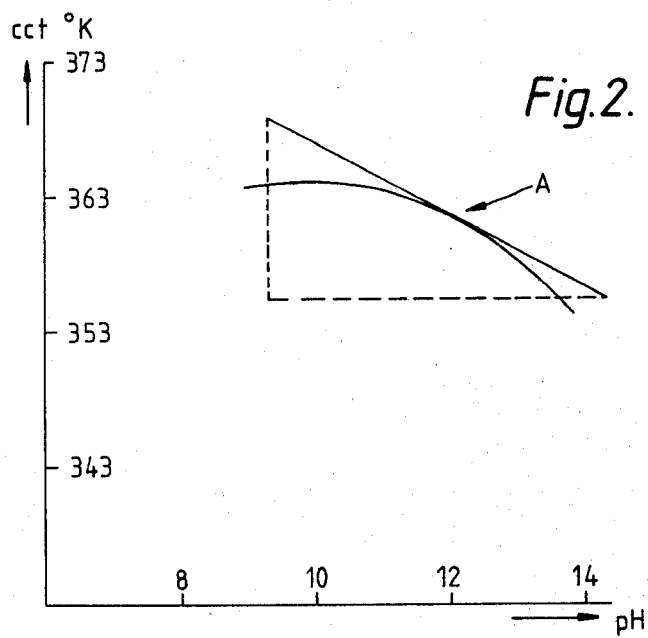

The determination of the ccv for two film-forming polymers is illustrated in FIGS. 1 & 2 and this indicates that the polymer of FIG. 1 is a useful polymer in the present process whereas the polymer of FIG. 2 is not a useful polymer in the present process.

Referring to FIG. 1:

$$A = 333°\ K.\ \&\ \frac{d(cct)}{d(pH)} = -10.3.$$

$$\therefore \frac{20\ d(cct)}{A\ d(pH)} = -0.62\ \text{units}$$

Referring to FIG. 2:

$$A = 362°\ K.\ \&\ \frac{d(cct)}{d(pH)} = -2.2$$

$$\therefore \frac{20\ d(cct)}{A\ d(pH)} = -0.12\ \text{units}$$

This prediction was confirmed by electrodeposition experiments in which a cathode and a counter-electrode were immersed in each dispersion of polymer at 10% polymer content by weight and an electric current passed at 100 volts. A thick deposit of the polymer of FIG. 1 was obtained on the cathode after 30 seconds. No deposit of the polymer of FIG. 2 was obtained even after 3 minutes and even after increasing the voltage to 300 volts. The polymer of FIG. 1 was obtained by the method of Example 1, the reactants being "Epikote 1001", polyethylene glycol molecular weight 2000, diol-terminated p-caprolactone and p-nitrobenzoic acid in the molar ratio 1.1/0.3/0.5/0.1. The polymer of FIG. 2 was obtained in a similar way but using the same reactants as in the molar ratio 1.1/1.1/1.3/0.

The invention also provides a coated substrate which has been coated by the process described above. The process is applicable to a wide variety of substrates which are conductors of electricity or on which deposition may occur due to their being in the vicinity of a cathode in an electric circuit. Suitable substrates include iron, steel and aluminium whether as the bare metal or after treatment such as by phosphation or by tin-plating. The conditions of deposition are illustrated in the following Examples. The potential difference may be for example in the range 10–300 volts direct current, and the time of passing current to obtain a coating may vary, for example, in the range 1–200 seconds.

The invention is illustrated by the following examples in which parts and percentages are by weight unless otherwise stated. Each of the film-forming polymers used had an electrophoretic mobility of not greater than 2 $\mu$/s/V/cm when measured in $10^{-3}$M potassium chloride at the pH at which it is employed in a coating process.

EXAMPLE 1

This Examples describes the preparation of an aqueous coating composition comprising a film-forming polymer sterically stabilised by a moiety derived from a poly(ethylene glycol) and its use in an electrodeposition process according to the invention.

(a) Preparation of film-forming polymer 'A1'

A 1-liter flask was charged with 1332 parts of an epoxy resin of epoxide equivalent of 62 mg of KOH (commercially available as 'Epikote 1001'; 'Epikote 1001 is a Registered Trade Mark of Shell Chemicals), 336 parts of polycaprolactone diol (PCP-0200 ex-Union Carbide), 900 parts of methylisobutylketone and 11 parts of dimethylbenzylamine and the mixture heated for 7 hours with stirring at 120° C. 820 parts of the monomethylether of a poly(ethylene glycol) of molecular weight approximately 2000 were then added and heating continued at 120° C. for a further 7 hours to produce a clear product of viscosity 28 poise at 50° C. as measured by using a cone and plate viscometer (with heated bottom plate).

(b) Preparation of coating composition 108.4 parts of the product of (a) were blended, using gentle heat with 37.7 parts of a blocked isocyanate crosslinking agent of the type described by D. Solomon on page 226 in "The Chemistry of Organic Film-Formers", 2nd edition (R. E. Kreiger Publishing Company), (and prepared from 2-ethyl hexanol/trimethylolpropane/tolylene diisocyanate in the molar ratio of 1/0.34/1, having a viscosity of 87 seconds in a 'body tube' and 65% solids in a 76/24 mixture of methyl isobutylketone/monoethylether of ethylene glycol), 0.96 part of dibutyl tin oxide, 18.85 parts of the monomethyl ether of ethylene glycol and 9.5 parts of the monohexylether of ethylene glycol. The blend was emulsified in deionised water using a high speed stirrer to produce a fine stable emulsion of 10% solids content having a viscosity of 23 seconds in a B3 cup at 25° C. The electrical conductivity of the continuous phase of the emulsion was 12 microsiemens/cm. The ccv of the polymer 'A1' as determined by the test hereinbefore described was −0.8 units.

(c) Electrodeposition of coating composition

A bare steel panel was immersed as cathode in the emulsion prepared in (b) and an electric current passed at 100 volts for 30 seconds. A film was deposited and this was rinsed, air-dried and stoved at 180° C. for ½ hour. A clear, smooth, cured film was produced. A similar result was obtained with tin-plated steel, phosphated steel and aluminium panels.

EXAMPLE 2

This Example describes the modification of the film-forming polymer A1 of Example 1, and the use of the blocked isocyanate cross-linking agent of Example 1 in a coating composition which is applied to a substrate by electrodeposition.

(a) Preparation of film-forming polymer B1 by modification of film-forming Polymer A1

300 parts of the product of Example 1(a) were charged to a flask with 4.1 parts of paranitrobenzoic acid and cooked together at 130° C. until the acid value was approximately zero. The product was designated 'B1'.

(b) Preparation of coating composition 304 parts of B1 were blended with 100 parts of the crosslinking agent described in Example 1(b), 52.9 parts of the monomethyl ether of ethylene glycol, 26.6 parts of the monohexyl ether of ethylene glycol and 2.7 parts of dibutyl tin oxide. The blend was emulsified in water to give a 10% solids by weight emulsion of the blend in water which had a conductivity of 16 microsiemens and a pH of 7. The ccv was found to be −0.6 units. The electrophoretic mobility of the disperse particles in the coating composition measured in $10^{-3}$M potassium chloride was less than 0.7 $\mu$/s/V/cm at pH 6.9.

(c) Electrodeposition of coating composition

A bare steel panel was coated as a cathode when immersed in this emulsion by passing an electric current at 100 volts for 30 seconds. The coherent coating obtained was dried and stoved at 180° C. for ½ hour to provide a smooth film on the substrate. The coulomb yield was 459 mg/coulomb.

When the pH of the emulsion was increased to 9 by the addition of ammonia, the conductivity was increased to 45 microsiemens; and when a bare steel panel was coated as cathode at 200 volts for 30 seconds the coulomb yield was 135 mg/coulomb.

EXAMPLE 3

In this Example, there is used a film-forming material B2 which is analogous to B1 of Example 2, but has been modified with benzoic acid.

300 parts of film-forming polymer A1 of Example 1 were modified with 3 parts of benzoic acid by the procedure of Example 2 to yield a film-forming polymer B2 having an acid value of less than 0.2 mg KOH/g.

108.4 parts of polymer B2 were blended with the same quantities of the ingredients used in the preparation of the coating composition of Example 1(b) and the blend emulsified in deionised water to give an emulsion of 10% solids content by weight and having a conductivity of 16 microsiemens. The ccv was found to be −1.1 units.

A bare steel panel was coated as a cathode when immersed in this emulsion by passing an electric current at 100 volts for 30 seconds and the coating air-dried and stoved at 180° C. for ½ hour. The coulomb yield was 103 mg/coulomb.

When the pH of the emulsion was adjusted to 9.2 with ammonia, the conductivity of the emulsion increased to 66 microsiemens per cm at 25° C. When a steel panel was coated in this emulsion by passing current at 200 volts for 30 seconds, and passage of 29 coulomb. After stoving at 180° C. for ½ hour, it produced a film weighing 1.49 g.

EXAMPLE 4

In this Example, there is used a film-forming material 'B3' which is analogous to 'B1' of Example 2, but has been modified instead with chloracetic acid.

300 parts of film-forming polymer 'A1' of Example 1 were modified with 2.6 parts of chloracetic acid by the procedure of Example 2 to yield a film-forming polymer 'B3' having an acid value of less than 0.2 mg KOH/g.

108.4 parts of polymer 'B3' were blended with the same quantities of the ingredients used in the preparation of the coating composition of Example 1(b) and the blend emulsified in water to give a stable emulsion of 10% by weight solids content, and pH 7, and having a conductivity of 23 microSiemens per cm at 27° C. The ccv was found to be −1.2 units.

A bare steel panel was coated as a cathode when immersed in this emulsion by passing an electric current at 100 volts for 30 seconds and the coating rinsed, air-dried and stoved at 180° C. for ½ hour. The coulomb yield was 302 mg/coulomb after stoving.

When the pH of the emulsion was adjusted to 9.2 and a phosphated steel panel used as the cathode at 100 volts for 30 seconds, the coulomb yield was 82 mg/coulomb after stoving at 180° C. for ½ hour.

EXAMPLE 5

In this Example, there is used a film-forming material 'B4' which is analogous to 'B1' of Example 2 but has been modified instead with para-aminobenzoic acid.

300 parts of film-forming polymer 'A1' of Example 1 were modified with 3.9 parts of para-aminobenzoic acid by the procedure of Example 2 to yield a film-forming polymer 'B4' having an acid value of less than 0.2 mg KOH/g.

108.4 parts of film-forming polymer 'B4' were blended with the same quantities of the ingredients used in the preparation of the coating composition of Example 1(b) and the blend emulsified in water to give a stable emulsion of 10% by weight solids content and pH 6.3, and having a conductivity of 21 microsiemens at 20° C. The ccv was found to be −1.5 units.

A bare steel panel was coated as cathode when immersed in this emulsion by passing an electric current at 100 volts for 30 seconds and the coating stoved. A similar result was obtained with a phosphated steel panel.

EXAMPLE 6

In this Example, there is used a film-forming polymer 'C' which is derived from the epoxy resin-based film-forming polymer 'A1' but also comprises grafted addition polymer.

300 parts of film-forming polymer 'A1' of Example 1 were heated for 9 hours at 120° C. with 5.8 parts methacrylic acid until the final acid value was about 2 mg KOH/g. The temperature was lowered to 80° C. and over a period of 20 minutes was added a mixture of 61 parts methyl methacrylate, 27 parts 2-ethylhexyl acrylate and 0.5 part of a peroxide catalyst commercially available as "Perkadox" 16N. After holding for 2 hours at 80° C., a further 0.3 part of the peroxide catalyst was added and the temperature maintained at 80° C. for a further 2 hours. The resulting clear product, polymer 'C', had a 68% by weight solids content.

102.6 parts of film-forming polymer 'C' were blended with 37.7 parts of the crosslinking agent of Example 1(b), 18.9 parts of the monomethylether of ethylene glycol, 9.5 parts of the monohexylether of ethylene glycol and 0.9 part of dibutyl tin oxide. This blend was emulsified in water to give a stable emulsion of 10% solids by weight having a conductivity of 44 microsiemens and a pH of 5.

A bare steel panel was coated as a cathode when immersed in this emulsion by passing an electric current at 100 volts for 30 seconds and the panel was stoved at 180° C. to produce a smooth clear coating. A similar result was obtained with a phosphated steel panel. The ccv was measured and found to be −0.6 units.

EXAMPLE 7

In this Example, the film-forming polymer 'B5' which is used is similar to that used in Example 2 but the moiety derived from the poly(ethylene glycol) is of lower molecular weight.

A film-forming polymer 'A2' was first prepared by heating at 125° C. for 19 hours, 450 parts of 'Epikote' 1001, 113.5 parts of polycaprolactone diol, 360 parts methyl isobutyl ketone, 3.4 parts dimethyl benzylamine and 277 parts of the monomethylether of a poly(ethylene glycol) of molecular weight approximately 750.

To 560 parts of the resulting product 'A2', was added 11.86 parts para-nitrobenzoic acid and the mixture heated at 140° C. for 4 hours. The product 'B5' had an acid value of 0.3 mg KOH/g.

112.6 parts of film-forming polymer B5 were blended with 37.7 parts of the isocyanate crosslinking agent used in Example 1, 0.95 part dibutyl tin oxide, 18.9 parts of the monomethylether of ethylene glycol and 9.5 parts of the monohexylether of ethylene glycol. This blend was emulsified in water to produce a stable, fine particle emulsion of 10% by weight solids content, pH 7 and a conductivity of 21 microsiemens per cm. The ccv was −0.7 units.

A bare steel panel was coated as a cathode immersed in this emulsion by passing an electric current at 100 volts for 30 seconds. The coulomb yield was 390 mg/coulomb after stoving at 180° C. for ½ hour.

When the pH of the emulsion was adjusted with ammonia to pH 8.3, the conductivity was 38 microsiemens per cm. The coulomb yield at a steel cathode at 100 volts and 30 seconds, was 158 mg/coulomb after stoving at 180° C. for ½ hour.

EXAMPLE 8

In this Example, a modified film-forming polymer 'B6' of structure related to 'B1' of Example 2 is prepared by a different route.

395 parts of 'Epikote' 1001 were heated under reflux for 8 hours at 136° C. with 90 parts methyl isobutyl ketone and 10.35 parts para-nitrobenzoic acid, by which time the acid value was approximately zero. The product was gradually fed over one hour into a mixture of 100 parts poly(ethylene glycol) of molecular weight 600, 168 parts of polycaprolactone diol as described before, and 1.1 part of a 45% by weight solution of ethereal boron trifluoride. The temperature was maintained at 80° C. for a further 7 hours to give a clear viscous polymer 'B6'.

116.5 parts of film-forming polymer 'B6', 43.9 parts of a caprolactam-blocked isocyanate curing agent prepared in a similar manner to that sample 1(b), from trimethylol propane/caprolactam/tolylene diisocyanate=0.34/1.00/1.00 molar (having a viscosity of 87 secs BT and 65% by weight solids content in 76/24 mixture of methylisobutyl ketone/monoethylether of ethylene glycol), 12.0 parts monomethylether of ethylene glycol and 6 parts monohexylether of ethylene glycol were emulsified in water to give a 15% by weight solids emulsion which had a pH 5.4 and a conductivity of 60 microsiemens. The ccv was found to be below room temperature at pH 12, therefore the ccv must be very much less than −0.3 units.

Various metal panels as detailed below were coated by electrodeposition when immersed as the cathode in the above emulsion and an electric current passed for 30 seconds.

| Panel/Metal | Voltage | Coulombs passed | Wt of film after stoving at 150° C. for ½ hour. |
|---|---|---|---|
| A Bare steel | 40 | 1.0 | 1.34 |
| B Bare steel | 100 | 1.6 | 2.71 |
| C Phosphated steel | 100 | 1.3 | 2.05 |
| D Phosphated steel | 200 | 5.8 | 1.07 (some material lost from |

-continued

| Panel/Metal | Voltage | Coulombs passed | Wt of film after stoving at 150° C. for ½ hour. (panel). |
|---|---|---|---|
| E Aluminium | 100 | 1.2 | 1.97 |
| F Tin plate | 100 | 0.3 | 1.68 |

EXAMPLE 9

This Example describes the preparation of an aqueous coating composition comprising a film-forming polymer 'A3' stabilised by a moiety derived from a poly(ethylene glycol) and its use in an electrodeposition process according to the invention.

450 parts of 'Epikote' 1001 were heated at 130° C. for 14 hours with 131.3 parts of a dimer fatty acid commercially available as "Empol" 1024 ("Empol" is a Registered Trade Mark of Unilever-Emery), 193.7 parts of methyl isobutyl ketone, 3.8 parts of dimethylbenzylamine and 291.5 parts of a polyethylene glycol monomethylether of molecular weight 2000. The product 'A3' was a clear viscous resin of acid value less than 0.1 mg KOH/g.

106 parts of the above product containing film-forming polymer 'A3' were blended with 37 parts of the isocyanate crosslinking agent used in Example 1, 1.3 parts of dibutyl tin oxide, 19 parts of the monomethylether of ethylene glycol and 9.5 parts of the monohexylether of ethylene glycol and the clear viscous blend emulsified in water to give a 10% by weight solids emulsion having a pH 6.9 and conductivity of 31 microsiemens per cm at 25° C. The ccv was −0.6 units.

A steel panel was coated by electrodeposition when immersed as a cathode in the above emulsion by passing an electric current at 100 volts for 30 seconds. After rinsing and stoving at 180° C. for ½ hour, a tough clear coating was obtained.

EXAMPLE 10

In this Example, the polymer 'B1' of Example 2 is used, but the isocyanate crosslinking agent is that used in Example 8.

120 parts of film-forming polymer 'B1' of Example 2 were blended with 43.8 parts of the isocyanate crosslinking agent used in Example 8, 38.4 parts of the monomethylether of ethylene glycol and 28.8 parts of the monohexylether of ethylene glycol and the viscous resin solution emulsified in deionised water to give a fine, stable emulsion of 10% by weight solids which had a pH of 7 and a conductivity of 12 microsiemens per cm at 18° C.

A steel panel as a cathode was coated by electrodeposition when immersed in the above emulsion by passing an electric current for 30 seconds at 100 volts. The stoved panel had a Knoop hardness of 15.

EXAMPLE 11

This Example illustrates the use of a pigmented dispersion.

20 parts of carbon black, "Printex" 140V (ex-Degussa), was milled with 104 parts of polymer 'A1' of Example 2 and 10 parts ethylene glycol monobutylether in a small heavy duty mixer (pugmixer) for 25 minutes. Then 23 parts of the caprolactam blocked isocyanate curing agent (described in Example 8) were added to the mix and blended for a further 5 minutes.

The pigmented polymer blend was then heated to approximately 65° C. and fed into deionised water heated to 40° C. and agitated with a high speed stirrer (an Ystral homogeniser) to produce a fine aqueous dispersion at 15% dispersion solids.

A phosphated steel panel was coated as a cathode when immersed in this dispersion by passing an electric current at 100 volts for 30 seconds and when the panel was stoved at 150° C. for ½ hour, a smooth, glossy black coating was produced.

EXAMPLE 12

This Example illustrates the use of a melamine/formaldehyde crosslinking agent.

150 parts of film-forming polymer 'B1' (prepared as in Example 2) were blended with 52.3 parts of a commercially available hexamethoxymelamine/formaldehyde resin "Beetle" 370, available from BIP, Oldbury, Warley, West Midlands), 20.8 parts of the monomethylether of ethylene glycol and 10.5 parts of the monohexylether of ethylene glycol and the blend emulsified in deionised water to give a 15% by weight solids emulsion which had a pH of 6.7 and a conductivity of 30 microsiemens per cm.

Various metal panels as cathode were coated as follows:

| Panel | Volts/time (secs) | Wt of film after stoving at 195° C. for ½ hour | Coulombs passed |
|---|---|---|---|
| A Phosphated steel | 40/30 | 1.7 | 3.3 |
| B Phosphated steel | 100/30 | 2.2 | 3.8 |
| C Aluminium | 100/30 | 2.6 | 3.3 |

The pH of the emulsion was then adjusted to 9.5 with ammonia, and produced a conductivity of 84 microsiemens per cm.

| Panel | Volts/time (secs) | Wt of film after stoving at 195° C. for ½ hour | Coulombs passed |
|---|---|---|---|
| D Phosphated steel | 40/30 | 0.44 | 6.3 |
| E Phosphated steel | 100/30 | 1.62 | 13.8 |
| F Phosphated steel | 180/30 | 1.12 | 23.4 |
| G Phosphated steel | 100/60 | 2.08 | 20.6 |

EXAMPLE 13

This Example illustrates the use of a phenol/formaldehyde crosslinking agent.

150 parts of the film-forming polymer 'A1' of Example 1 were blended with 26.4 parts of a phenolformaldehyde resin commercially available as "Uravar" L9 from Synthetic Resins Ltd., Speke, Liverpool, 37 parts of the monomethylether of ethylene glycol and 19 parts of the monohexylether of ethylene glycol and the blend emulsified in deionised water to give an emulsion of 15% solids content, pH 6.3 and conductivity 24 microsiemens per cm.

Various metal panels as cathode were coated as follows:

| Panel | Volts/time (secs) | Wt of film after stoving at 180° C. for ½ hour | Coulomb passed |
|---|---|---|---|
| A Bare steel | 40/30 | 2.70 | 2.25 |
| B Bare steel | 100/30 | 2.81 | 4.95 |
| C Phosphated steel | 40/30 | 2.10 | 2.40 |
| D Phosphated steel | 100/30 | 3.28 | 4.95 |
| E Aluminium | 100/30 | 3.41 | 3.10 |
| F Phosphated steel | 200/30 | 2.93 | 3.00 |

EXAMPLE 14

This Example illustrates the difference in stability between a sterically stabilised dispersion of particles comprising film-forming polymer as employed in the process of the present invention and a series of commercially available charge-stabilised dispersions for cathodic deposition.

A solution of polyacrylic acid (commercially available as "Versicol E11" from Allied Colloids) was neutralised to pH 7 with ammonia solution and diluted to give a 10% by weight solution of ammonium polyacrylate in water. (Solution X).

(a) 2 g of Solution X was added to 15 g of an "Acrylic Cathodic Electropaint" dispersion commercially available from Sherwin-Williams known to be stabilised by ionised amine salts, and gently stirred. The dispersion collapsed, producing a coarse, heavy coagulum.

(b) 1.5 g of Solution X was added to 10 g of an "Acrylic Cathodic Electropaint" dispersion commercially available from PPG Industries and gently stirred. The dispersion collapsed, producing a heavy coagulum.

(c) 1.5 g of Solution X was added to 10 g of an "Epoxy-based Cathodic Electropaint" dispersion commercially available from PPG Industries and gently stirred. The dispersion collapsed.

(d) 2 g of Solution X was added to a commercially available epoxy-based cathodic electropaint, the preparation of which is described in British Pat. No. 1,461,823, and gently stirred. The dispersion collapsed.

(e) 2 g of Solution X was added to 10 g of the sterically-stabilised dispersion prepared according to Example 2 and gently stirred. No visible change in the stability of the dispersion was detected. Addition of a further 2 g of Solution X produced no change, whereas in (a) to (d) above this caused further destabilisation.

We claim:

1. A process for coating a conductive substrate wherein the substrate is immersed in a coating composition comprising an aqueous medium and a dispersed coating material, the substrate is made a cathode in an electric circuit, and an electric current is passed between the cathode and a counter-electrode until a desired amount of coating material is deposited on the substrate, characterised in that:
   (a) the coating material comprises a film-forming polymer which is sterically stabilised as a dispersion of particles in the aqueous medium and is free from stabilising ionic charges.
   (b) the film-forming polymer comprises, or is associated with, a polymeric non-ionic hydrophilic moiety which is solvated by the aqueous medium and which contributes to the steric stabilisation of the film-forming polymer particles in the aqueous medium; and
   (c) the dispersion of film-forming polymer particles in the aqueous medium has a 'critical coalescence value (ccv)' which is more negative than $-0.3$ units.

2. A process according to claim 1 wherein the polymeric non-ionic hydrophilic moiety solvated by the aqueous medium is derived from a water-soluble polymer which comprises repeating oxyethylene units.

3. A process according to claim 2 wherein the polymeric non-ionic hydrophilic moiety solvated by the aqueous medium is derived from a poly(ethylene glycol) or a monoalkyl ether thereof.

4. A process according to claim 1, wherein the film-forming polymer is an epoxy resin.

5. A process according to claim 1, wherein the electrophoretic mobility of the particles of film-forming polymer is not greater than 2 $\mu/s/V/cm$ when measured at very high dilution in $10^{-3}M$ potassium chloride at 25° C. and at the pH to be employed in the coating process.

6. A process according to claim 1, wherein the electrical conductivity of the aqueous medium is less than 250 microSiemens/cm at 25° C. when the disperse phase of film-forming polymer particles constitutes 10% by weight of the total weight of the dispersion.

7. A coating composition suitable for use in the process of claim 1 which comprises an aqueous medium and a dispersed coating material characterised in that:
   (a) the coating material comprises a film-forming polymer which is sterically stabilised as a dispersion of particles in the aqueous medium and is substantially free from stabilising ionic charges;
   (b) the film-forming polymer comprises, or is associated with, a polymeric non-ionic hydrophilic moiety which is solvated by the aqueous medium and which contributes to the steric stabilisation of the film-forming polymer particles in the aqueous medium; and
   (c) the dispersion of film-forming polymer particles in the aqueous medium has a 'critical coalescence value (ccv)' which is more negative than $-0.3$ units.

8. A coated substrate which has been coated by the process of claim 1.

* * * * *